Dec. 2, 1969  J. PRAHL  3,480,972
ANKLE JOINT FOR AN ARTIFICIAL LEG
Filed Sept. 21, 1966
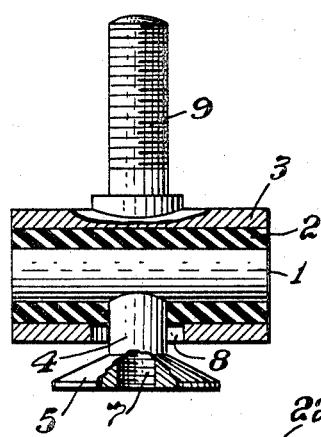
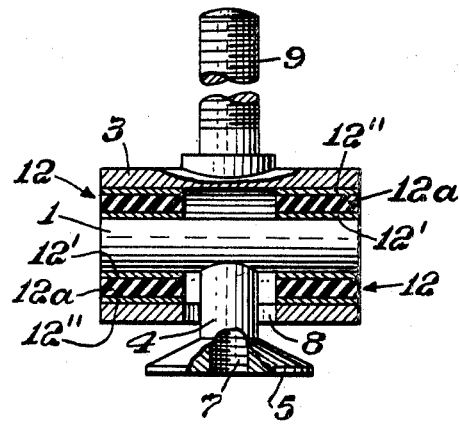
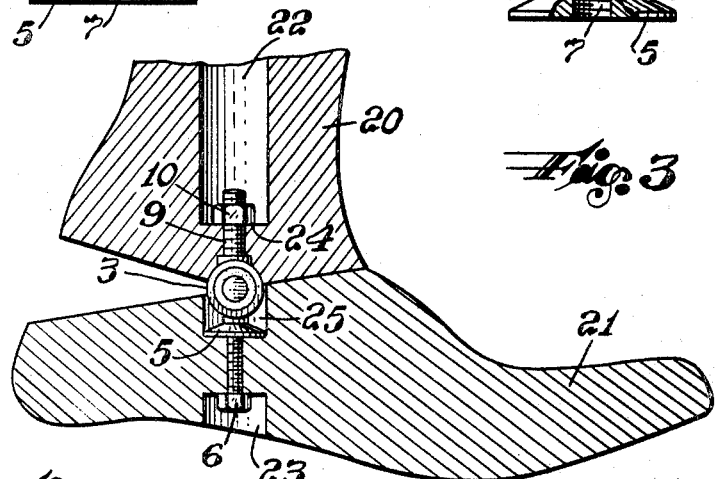
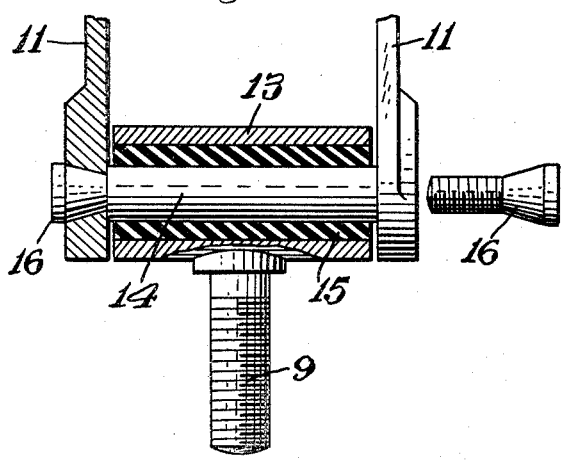
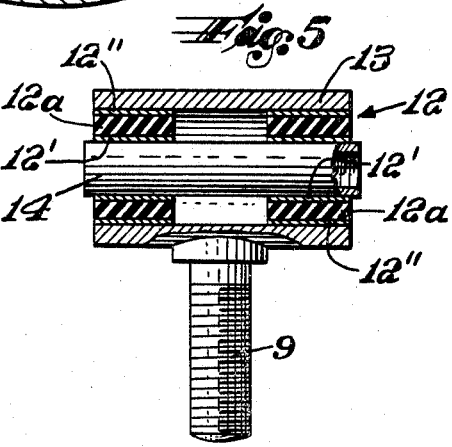
INVENTOR.
Jan Prahl
BY Richard Low
Ag't

United States Patent Office 3,480,972
Patented Dec. 2, 1969

3,480,972
ANKLE JOINT FOR AN ARTIFICIAL LEG
Jan Prahl, Gollenhof, Germany, assignor to Wilhelm J. Teufel, Stuttgart-O, Germany, a limited-liability company of Germany
Filed Sept. 21, 1966, Ser. No. 581,086
Claims priority, application Germany, Nov. 10, 1965,
T 29,760
Int. Cl. A61f *1/04*
U.S. Cl. 3—33          6 Claims

ABSTRACT OF THE DISCLOSURE

The lower leg and foot portions of an artificial leg are connected by an ankle joint in which a tube fixedly fastened to one of the portions spacedly envelops an inner member fixedly fastened to the other portion of the artificial leg. A unitary sleeve or two axially spaced rings of elastomeric material are interposed between the tube and the inner member in fixed engagement with the tube and the inner member and permit pivoting movement of the inner member about the axis of the tube and angular displacement of the inner member in a plane through the axis of the tube.

---

This invention relates to artificial limbs, and particularly to an ankle joint for an artificial leg and to its cooperation with the lower leg portion and the foot portion.

The ankle joint of an artificial leg must not only permit relative angular movement of the lower leg portion and the foot portion about a normally horizontal axis, but also limited pivoting movement in a plane substantially through said axis. Known artificial legs are equipped with ankle joints which are relatively complex, subject to wear, and apt to be noisy in operation, particularly when no longer new.

The object of the invention is the provision of an artificial leg whose ankle joint is simple, occupies but a minimum of space, and is not subject to wear which would make it noisy within any reasonable time.

With these objects and others in view, as will presently become apparent, the invention contemplates the use of an ankle joint which has a tubular outer member and an inner member at least partly received in the outer member for angular movement about the axis of the outer member in radially spaced relationship to the outer member. A yieldably resilient annular spacer arrangement is radially interposed between the inner and outer members of the joint in fixed engagement with the joint members which are respectively fixedly fastened to the lower leg portion and the foot portion of the artificial leg.

Other features and many of the attendant advantages of this invention will be readily appreciated as the same becomes better understood by reference to the following detailed description of preferred embodiments when considered with the accompanying drawing in which:

FIG. 1 shows an ankle joint of the invention and associated fastenings in front elevational section on the axis of the joint;

FIG. 2 shows a modification of the device of FIG. 1 in a corresponding view;

FIG. 3 illustrates an artificial leg equipped with one of the ankle joints shown in FIGS. 1 and 2 in side-elevational section on a reduced scale;

FIG. 4 illustrates another ankle joint of the invention and the associated fastenings in front-elevational section on the joint axis; and FIG. 5 shows a modification of the device of FIG. 4.

Referring now to the drawing in detail, and initially to FIG. 1, there is shown an ankle joint consisting mainly of a solid cylindrical shaft 1 tightly enveloped by a resiliently acting annular spacer or torsion element 2 which in turn is tightly encased in an outer cylindrical metal tube 3 coaxial with the shaft 1. The spacer 2 is made of rubber and is fixedly fastened to the shaft 1 and fixedly fastened to the tube 3 by its inner and outer faces being vulcanized to the outer surface of the shaft 1 and the inner surface of the tube 3, respectively. Being fixedly attached to the shaft 1 and tube 3, the spacer 2 can be twisted and compressed by exertion of external forces so that restitution will occur when the forces are released.

A tubular radial pin 4 is fixedly fastened to the axially central portion of the shaft 1 and extends therefrom through a conforming opening in the body of the spacer 2 and a larger opening 8 in the tube 3, the dimensions of the opening 8 being sufficient to permit, against the resilient restraint of the spacer 2, angular movement of the tube 3 and shaft 1 relative to each other about the axis of the tube through an angle of approximately 30 degrees, and also permitting limited relative angular displacement of the shaft 1 in a plane through said axis.

The pin 4 which forms a rigid, T-shaped unit with the shaft 1 is provided with internal threads 7, and its free end portion outside the tube 3 is provided with an integral shoulder or abutment plate 5 the purpose of which will presently become apparent. A threaded stud 9 is fixedly attached to the outer cylindrical surface of the tube 3 and extends therefrom in a direction which is normally diametrically opposite to that of the tubular pin 4.

The modified embodiment of the invention shown in FIG. 2 differs from the device of FIG. 1 in the provision of two spacers 12 which are axially offset from the pin 4 in opposite directions and replacing the single tubular spacer 2 shown in FIG. 1. The arrangement shown in FIG. 2 is preferred because it is more readily assembled and provides closer control of the performance of the joint in the afore-mentioned angular displacement. There is also a difference between the construction of the spacers 12 and that of the spacer 2 in FIG. 1. Each of the spacers 12 consists of two spaced and normally coaxial metal rings 12' and 12" and a sleeve 12a interposed between the rings and made from rubber or the like. In each of the spacers 12, the rings 12' and 12" are fixedly attached to the shaft 1 and tube 3, respectively, and the sleeve 12a is fixedly secured to the rings 12' and 12" by vulcanizing.

FIG. 3 shows one of the joints of FIGS. 1 and 2 assembled with the lower leg portion 20 and the foot portion 21 of an artificail leg. Bores 22, 23 in the two leg portions 20, 21 are aligned in the illustrated normal position of the foot portion 21. The tubular member 3 of the ankle joint is partly conformingly received in a recess in the bottom face of the leg portion 20 and is fixedly fastened to the leg portion 20 by the stud 9 which passes through a restricted portion of the bore 22 and carries a nut 10 in a wider portion of the bore 22, the nut abuttingly engaging a shoulder 24 at the junction of the two bore portions.

The remainder of the tube 3 is freely received in a recess 25 on the top face of the foot portion 21. The abutment plate 5 is held in firm abutting engagement with the bottom of the recess 25 by a bolt 6 which engages the threads 7 of the pin 4 and whose head abuts against a shoulder in the bore 23.

The angular movement of the shaft 1 and tube 3 in the coaxial condition is limited to somewhat less than the afore-mentioned angle of 30° by abutting engagement of respective faces of the leg portions 20, 21. Rubber buffers between these faces are not needed. Because of the fixed nature of the engagement between the engaging surafces of the spacer 2 or spacers 12, the shaft 1, and the tube 3, there is no displacement of the engaged surfaces. The spacer 2 or spacers 12 are strained in torsion, due to the resilient sleeve 2 or resilient sleeves 12a, 12a, and the resistance to the angular movement of the ankle joint increases with displacement from the normal position to which the foot portion 21 returns as soon as externally applied forces are relaxed.

The ankle joint shown in FIG. 4 has an outer metal tube 13 which is open in an axial direction only. It receives most of a tubular shaft 14 in a normally coaxial radially spaced relationship. A spacer 15 is radially interposed between the tube 13 and the shaft 14 to provide a torsion element. The shaft 14 is internally threaded over its entire length and projects axially from the tube 13 in both directions. The spacer 15 is an annular rubber member and is fixedly secured to the tube 13 and shaft 14.

A threaded stud 9 extends radially from the axial center portion of the tube 13 in a normally downward position for fixedly fastening the tube 13 to the foot portion of an artificial leg of the invention in a manner not further illustrated, but obvious from consideration of FIG. 3.

The lower leg portion of the artificial leg is partly illustrated in FIG. 4 and represented only by two metal braces 11 which are fastened to the shaft 14 by means of screws 16. The screws are threadedly received in respective axial end portions of the tubular shaft 14 in such a manner that each brace 11 abuttingly engages an annular end face of the shaft 14, thereby fixedly attaching the lower leg portion to the shaft 14.

The ankle joint shown in FIG. 5 is similar to that illustrated in FIG. 4, except for the replacement of the spacer 15 by two spacers of the same construction as the spacers 12 shown in, and discussed with reference to, FIG. 2. The ankle joints illustrated in FIGS. 4 and 5 cooperate with the nonillustrated or only partly illustrated foot and lower leg portions in the same manner as described with reference to FIG. 3.

It is a common feature of the several embodiments of the invention that the movable metal parts of the ankle joints illustrated never make direct contact with each other. The spacers 2, 12, 15 are interposed between the elements of the joints which are respectively fixedly fastened to the lower leg and foot portions. There is no frictional surface wear, and the joints operate noiselessly over the useful life of the resilient sleeves. Elastomeric materials which will perform satisfactorily over long periods of operation in the ankle joints of the invention are stable articles of commerce. While rubber and particularly synthetic rubber is preferred for the resilient sleeves among the materials readily available at this time, the invention is not limited to specific yieldably resilient materials nor to other details of the embodiments illustrated and described.

I claim:
1. An artificial leg comprising
   (a) a lower leg portion,
   (b) a foot portion,
   (c) an ankle joint including
      (1) a tubular outer member having an axis extending longitudinally thereof and an inner cylindrical surface about said axis,
      (2) an inner member at least partly received within said outer member and having an outer cylindrical surface radially spaced from said inner cylindrical surface, said outer and inner members being adapted to move angularly about said axis relative to each other, and
      (3) two yieldably resilient annular spacer members provided within the annular space between said outer and inner members substantially at the ends of said annular space, each of said spacer members including two radially spaced substantially coaxial rings and a sleeve of elastomeric material interposed between and fixedly secured to said rings, each spacer member having an outer and an inner face, fixedly fastened to said inner and said outer surface respectively, each of said rings being made of a substantially rigid non-elastic material, each of said spacer members forming an inseparable structure,
   (d) first fastening means fixedly fastening said outer member to one of said portions, and
   (e) second fastening means fixedly fastening said inner member to the other one of said portions.

2. A leg as set forth in claim 1, wherein said rings are metallic and said sleeve is vulcanized to said rings.

3. A leg as set forth in claim 1, wherein said second fastening means includes threadedly engaged elements on said inner member and on said other portion, respectively, at least one of said elements extending through an opening in said outer member with sufficient clearance to permit relative pivoting movement of said inner and outer members in a plane through said axis against the resilient restraint of said spacer means.

4. A leg as set forth in claim 3, comprising a substantially T-shaped element constituted by said inner member and one of said threadedly engaged elements, said one element radially extending from an axially central portion of said inner member, and said opening radially extending through said outer member and receiving said one element.

5. A leg as set forth in claim 3, wherein said one threadedly engaged element is an integral portion of said inner member axially projecting from said outer member.

6. A leg as set forth in claim 3, wherein said one element is internally threaded, the internal thread of said one element engaging a threaded element on said other portion.

References Cited
UNITED STATES PATENTS

| | | | |
|---|---|---|---|
| 41,535 | 2/1864 | Reinhardt | 3—33 |
| 295,675 | 3/1884 | Collins | 3—33 XR |
| 1,102,774 | 7/1914 | Martinchek | 3—34 |
| 1,911,440 | 5/1933 | Desoutter | 3—31 |
| 2,605,475 | 8/1952 | Burger et al. | 3—32 |

FOREIGN PATENTS

| | | |
|---|---|---|
| 41,390 | 10/1932 | France. |
| 711,480 | 6/1931 | France. |
| 591,696 | 1/1934 | Germany. |
| 249,408 | 3/1926 | Great Britain. |

RICHARD A. GAUDET, Primary Examiner

R. L. FRINKS, Assistant Examiner

U.S. Cl. X.R.

3—7